(12) United States Patent
Bouvet et al.

(10) Patent No.: US 9,175,662 B2
(45) Date of Patent: Nov. 3, 2015

(54) FRANCIS-TYPE RUNNER FOR A HYDRAULIC MACHINE, HYDRAULIC MACHINE INCLUDING SUCH A RUNNER, AND METHOD FOR ASSEMBLING SUCH A RUNNER

(75) Inventors: Yves Bouvet, La Terrasse (FR); Fabrice Tassy, Saint-Egreve (FR); Louis Mathieu, Sorel-Tracy (CA); Georges Rossi, Saint Ismier (FR)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 641 days.

(21) Appl. No.: 13/060,769

(22) PCT Filed: Sep. 4, 2009

(86) PCT No.: PCT/FR2009/051676
§ 371 (c)(1),
(2), (4) Date: May 12, 2011

(87) PCT Pub. No.: WO2010/026349
PCT Pub. Date: Mar. 11, 2010

(65) Prior Publication Data
US 2011/0206518 A1     Aug. 25, 2011

(30) Foreign Application Priority Data
Sep. 5, 2008   (FR) .................................... 08 55981

(51) Int. Cl.
*F01D 5/22*     (2006.01)
*F03B 3/12*     (2006.01)
*B21D 53/78*    (2006.01)

(52) U.S. Cl.
CPC ........... *F03B 3/125* (2013.01); *F05B 2210/403* (2013.01); *F05B 2230/21* (2013.01); *F05B 2230/232* (2013.01); *Y02E 10/223* (2013.01); *Y10T 29/49316* (2015.01)

(58) Field of Classification Search
CPC ................. F03B 3/125; F05B 2230/21; F05B 2230/232; F05B 2210/403; Y10T 29/49316
USPC .... 416/185, 186 R, 187, 23 B, 213 R, 213 A; 29/889, 889.21, 889.22, 889.3
See application file for complete search history.

(56) References Cited

U.S. PATENT DOCUMENTS 1,670,558  A  *  5/1928  White ........................ 416/186 R
1,917,037  A  *  7/1933  Jessop et al. ................ 29/889.21
(Continued)

FOREIGN PATENT DOCUMENTS

CA       2438429  A1     2/2005
CS       8804819  A  *   1/1990
(Continued)

*Primary Examiner* — Dwayne J White
*Assistant Examiner* — Alexander White
(74) *Attorney, Agent, or Firm* — Buchanan Ingersoll & Rooney PC

(57) ABSTRACT

The present invention relates to a Francis runner for a hydraulic machine that comprises a belt with a rotational symmetry about a central axis of the runner, a ceiling with a rotational symmetry about the axis, and a plurality of blades ($2_1$, $2_2$) extending between the ceiling and the belt. The runner also includes at least two elements (41, 42, 43, 61, 62, 63) partially defining at least the belt and/or the ceiling while at least one edge ($23_1$, $23_2$, $24_1$, $24_2$) of a blade ($2_1$, $2_2$) is inserted between the two elements defining the belt and/or the ceiling.

9 Claims, 4 Drawing Sheets

(56) References Cited

U.S. PATENT DOCUMENTS

| | | | | |
|---|---|---|---|---|
| 2,332,330 A | * | 10/1943 | McMahan | 164/98 |
| 2,429,324 A | * | 10/1947 | Meisser | 416/188 |
| 2,625,365 A | * | 1/1953 | Moore | 416/186 R |
| 2,652,191 A | * | 9/1953 | Buchi | 416/186 R |
| 2,778,095 A | * | 1/1957 | Schorner | 29/889.21 |
| 3,139,265 A | * | 6/1964 | Lindquist | 416/186 R |
| 3,246,699 A | * | 4/1966 | Jocz | 416/215 |
| 3,260,443 A | * | 7/1966 | Garnett et al. | 416/182 |
| 3,298,444 A | * | 1/1967 | Haas | 416/186 R |
| 3,608,172 A | * | 9/1971 | Lindquist | 29/889.2 |
| 3,797,965 A | * | 3/1974 | Tonooka et al. | 416/186 R |
| 3,918,627 A | | 11/1975 | Kawano et al. | |
| 4,012,170 A | * | 3/1977 | Grubb | 416/186 R |
| 4,195,396 A | * | 4/1980 | Blazek | 29/889 |
| 4,201,516 A | * | 5/1980 | Kolk et al. | 416/213 R |
| 5,242,268 A | * | 9/1993 | Fukazawa et al. | 416/188 |
| 5,318,406 A | * | 6/1994 | Bardes | 416/223 A |
| 5,478,201 A | * | 12/1995 | Amr | 415/206 |
| 6,135,716 A | * | 10/2000 | Billdal et al. | 416/183 |
| 6,276,899 B1 | * | 8/2001 | Lambert et al. | 416/186 R |
| 6,537,030 B1 | * | 3/2003 | Garrison | 416/185 |
| 6,663,347 B2 | * | 12/2003 | Decker et al. | 416/185 |
| 7,128,534 B2 | * | 10/2006 | Enomoto et al. | 416/185 |
| 7,189,062 B2 | * | 3/2007 | Fukizawa et al. | 416/185 |
| 7,195,459 B2 | * | 3/2007 | Enomoto et al. | 416/185 |
| 7,198,470 B2 | * | 4/2007 | Enomoto et al. | 416/185 |
| 7,210,908 B2 | * | 5/2007 | Keck | 416/186 R |
| 7,220,106 B2 | * | 5/2007 | Paquet et al. | 416/183 |
| 7,416,393 B2 | * | 8/2008 | Richter | 416/213 R |
| 7,628,586 B2 | * | 12/2009 | Feher | 416/186 R |
| 7,632,073 B2 | * | 12/2009 | Ranz et al. | 416/186 R |
| 2005/0089404 A1 | * | 4/2005 | Enomoto et al. | 416/186 R |
| 2006/0096091 A1 | * | 5/2006 | Carrier | 29/889.2 |
| 2007/0134098 A1 | | 6/2007 | Huber et al. | |
| 2007/0231141 A1 | * | 10/2007 | Chaing et al. | 416/185 |
| 2009/0095719 A1 | * | 4/2009 | Tsukamoto et al. | 219/121.63 |
| 2009/0208336 A1 | * | 8/2009 | Lindskog | 416/186 R |

FOREIGN PATENT DOCUMENTS

| | | | | |
|---|---|---|---|---|
| EP | 267405 A2 | * | 5/1988 | F01D 5/04 |
| EP | 1744056 A | | 1/2007 | |
| FR | 1267669 A | | 7/1961 | |
| GB | 925943 A | * | 5/1963 | F03B 3/125 |
| JP | 53000403 A | * | 1/1978 | F04D 29/22 |
| JP | 55019928 A | * | 2/1980 | F03B 3/12 |
| JP | 55035129 A | * | 3/1980 | F03B 3/12 |
| JP | 55064193 A | * | 5/1980 | F04D 29/28 |
| JP | 55078196 A | * | 6/1980 | F04D 29/28 |
| JP | 55123374 A | * | 9/1980 | F03B 3/12 |
| JP | 57105596 A | * | 7/1982 | F04D 29/28 |
| JP | 58119998 A | * | 7/1983 | F04D 29/28 |
| JP | 59063399 A | * | 4/1984 | F04D 29/22 |
| JP | 60069211 A | * | 4/1985 | F01D 5/04 |
| JP | 60088898 A | * | 5/1985 | F04D 29/28 |
| JP | 60175774 A | * | 9/1985 | F03B 3/12 |
| JP | 61197800 A | * | 9/1986 | F04D 29/28 |
| JP | 02157404 A | | 6/1990 | |
| JP | 04094402 A | * | 3/1992 | |
| JP | 05202701 A | * | 8/1993 | |
| JP | 2005146934 A | * | 6/2005 | |
| JP | 2005171772 A | * | 6/2005 | |
| JP | 2006029198 A | * | 2/2006 | |
| WO | 2008034492 A | | 3/2008 | |

* cited by examiner

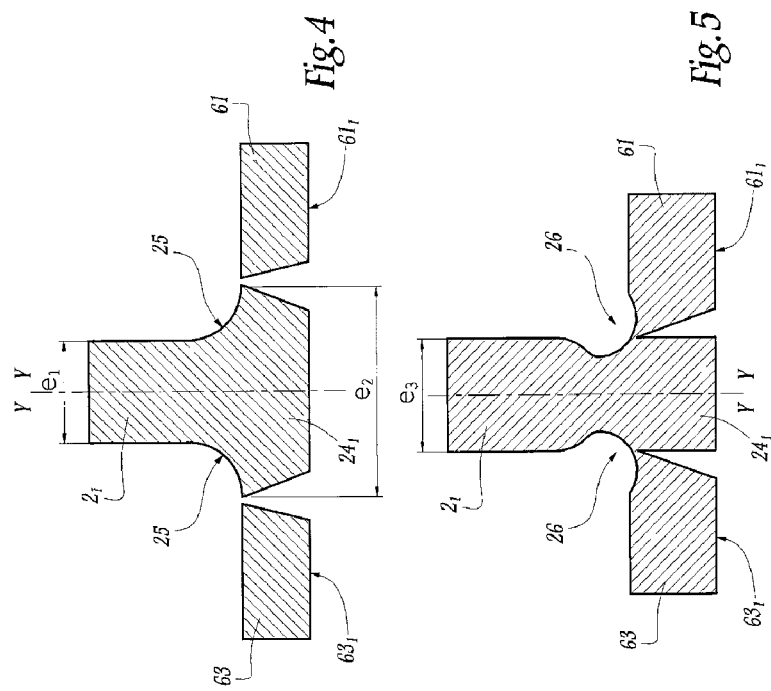

FRANCIS-TYPE RUNNER FOR A HYDRAULIC MACHINE, HYDRAULIC MACHINE INCLUDING SUCH A RUNNER, AND METHOD FOR ASSEMBLING SUCH A RUNNER

The present invention relates to a Francis-type runner for a hydraulic machine, to a hydraulic machine comprising such a runner, and to a method of assembling such a runner.

Within the meaning of the present invention, a hydraulic machine may be a turbine, a pump or a pump turbine, used, for example, in a hydroelectric power station.

The invention relates in particular to a Francis-type runner for a hydraulic machine intended to have a forced flow of water passed through it. Such a flow has the effect of rotating the runner, when the machine is a turbine. When the machine is a pump, such a flow results from the rotation of the runner.

In the context of a hydraulic machine, it is known practice to use Francis-type runners that have a band, a crown and blades extending between the band and the crown.

A runner may be of one piece, usually of cast or mechanically welded construction. Because such a runner has imposing overall dimensions, its cost of production is not insignificant. Moreover, the manufacture of such a runner, firstly, requires a known-how which is becoming increasingly rare and secondly presents health and safety issues because of the need to get into the hydraulic passages of the runner in order notably to perform the welding and grinding operations.

It is an object of the present invention to provide a runner, the production of which can be readily industrialized, while at the same time guaranteeing a satisfactory level of quality.

To this end, the subject of the invention is a Francis-type runner for a hydraulic machine, comprising:
  a band with symmetry of revolution about a central axis of the runner,
  a crown with symmetry of revolution about the axis, and
  a plurality of blades extending between the crown and the band,
characterized in that the runner comprises at least two elements at least partially defining the band and/or the crown, and in that at least one edge of a blade is engaged between these two elements defining the band and/or the crown.

By virtue of the runner according to the invention, its manufacturer is in a position to alleviate the problems associated both with the quality of the runner and with the production cost and lead time thereof.

According to other advantageous features of the runner according to the invention, considered in isolation or in any technically feasible combinations:
  the lower edge and/or the upper edge of at least one blade lies flush with the exterior surface of the band and/or of the crown;
  the runner comprises at least two band elements and two crown elements, each element being fixed between two adjacent blades by welding;
  the runner comprises at least one first subassembly defined by a first part of the band and a first part of the crown, the two parts being connected to a first blade, the first subassembly being cast, and a second subassembly, defined by a second part of the band and a second part of the crown, the two parts being connected to a second blade, the second subassembly being cast and welded to the first subassembly;
  at least one of the blades comprises two lateral fillets facing one another and positioned near at least one edge for welding to the band and/or to the crown;
  the lateral fillets are machined in the blade;
  the lateral fillets define a local narrowing.

Another subject of the invention is a hydraulic machine comprising a runner as described hereinabove.

Furthermore, another subject of the invention is a method of assembling a runner as explained hereinabove. According to this method:
  band elements and/or crown elements are manufactured, and
  the band elements and/or crown elements are assembled by welding and/or through casting, with at least one edge of one blade being engaged between two band elements and/or crown elements.

The invention will be better understood from reading the description which will follow, given solely by way of non-limiting example and made with reference to the accompanying drawings in which:

FIG. 4 is a view, to a larger scale, corresponding to detail IV in FIG. 3, of a runner according to a second embodiment;

FIG. 5 is a view similar to FIG. 4 in the case of a runner according to a third embodiment;

Figure 1:
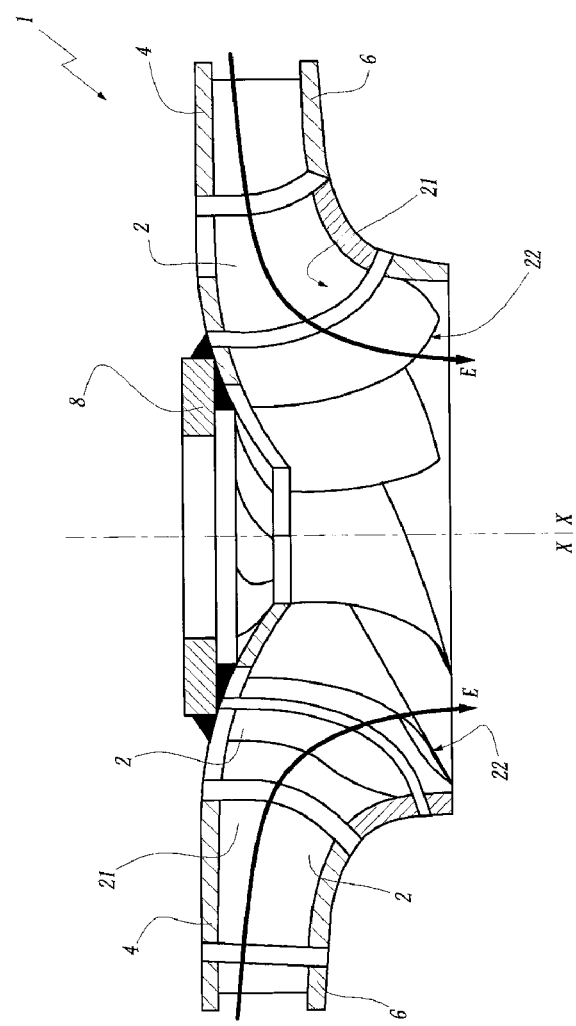
FIG. 1 is an axial section through a runner according to the present invention.
Figure 2:
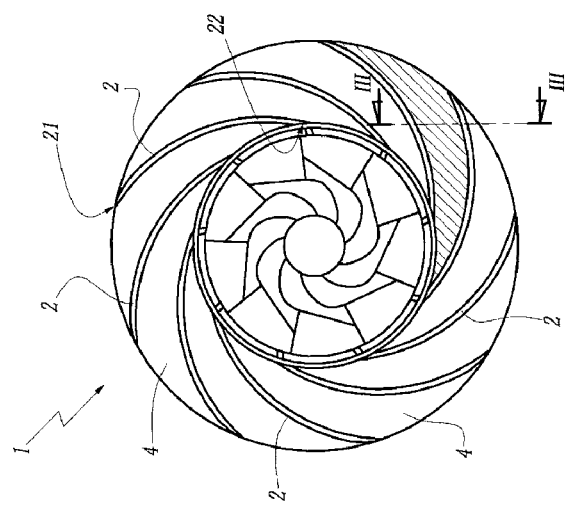
FIG. 2 is the runner of FIG. 1 viewed from above.

FIGS. 1 and 2 depict a Francis-type turbine runner 1 which rotates about a vertical axis X-X which is a central axis of the runner 1. A flow E from a duct not depicted is intended to pass through the runner 1 in the direction of a draft tube, not depicted. The runner 1 comprises blades 2 which extend between a crown 4 and a band 6. These two bodies 4 and 6 have symmetry of revolution about the axis X-X. The blades 2 are evenly distributed about the axis X-X.

As depicted more specifically in FIG. 2, the nine blades 2, secured to the crown 4 and to the band 6, are curved. The blades 2 each define a leading edge 21, facing toward the outside of the runner 1, and a trailing edge 22, facing toward the axis X-X.

The runner 1 also comprises a coupling flange 8 for coupling the runner 1 to a shaft, not depicted, of the turbine. The flange 8 may be made either of sheet metal or as a casting. The flange 8 may then be welded to the other elements that make up the runner.

As depicted in FIG. 2, the crown 4 comprises nine distinct elements, each separated from the adjacent element by a blade 2. In the cross-sectional view that is FIG. 3, a first element 41 partially defines the crown 4. A second 42 and third 43 element of the crown 4 are positioned one on each side of the element 41. This element 41 is separated from the two elements 42 and 43 respectively by an upper and inner edge $23_1$ or $23_2$ of a first blade $2_1$ and of a second blade $2_2$.

In other words, the crown 4 is made up of nine elements 41, 42, 43, etc. each positioned between the upper and inner edges $23_1$, $23_2$, etc. of adjacent blades $2_1$, $2_2$, etc. The edges $23_1$, $23_2$, etc. of the blades $2_1$, $2_2$, etc. are, for their part, engaged between the elements 41, 42, 43, etc. that form the crown 4.

Figure 3:
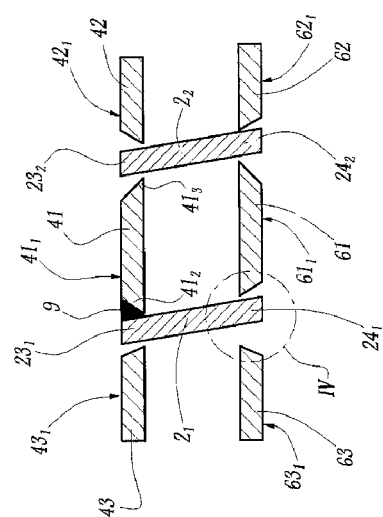
FIG. 3 is, to a larger scale, a part section on III-III of FIG. 2 through the runner of FIGS. 1 and 2 while the runner is in the process of being manufactured.

The band 6, like the crown 4, comprises nine elements. In FIG. 3, a first element 61 is positioned between two other elements 62 and 63 of the band. This element 61 is separated from the elements 62 and 63 respectively by lower and outer edges $24_1$ and $24_2$ of the first blade $2_1$ and of the second blade $2_2$.

It may be noted that the upper and inner edge $23_1$ or $23_2$ of each of the two blades $2_1$ and $2_2$ lies flush with the exterior surface of the crown 4 which surface is formed by the respective upper surfaces $41_1$, $42_1$, $43_1$, etc. of the elements 41, 42, 43 and equivalent. Likewise, the lower and outer edge $24_1$ or $24_2$ of each of these two blades $2_1$, and $2_2$ lies flush with the exterior surface of the band 6 which surface is formed by the respective exterior surfaces $61_1$, $62_1$, $63_1$, etc., of the elements 61, 62, 63 and equivalent.

The crown elements 41, 42 and 43 and the band elements 61, 62 and 63 are secured to the adjacent blades $2_1$ and $2_2$ by welding. This method is advantageously performed via an exterior route, in the region where the edge of a blade lies flush with an exterior surface of a crown or band element. This then avoids having welded connections between these bodies on the inside of the runner and, more specifically, in the hydraulic passages defined between two blades.

To do this, and as depicted in FIG. 3 which is a section while welding is in progress, edges $41_2$ and $41_3$ of the element 41 which respectively adjoin the blades $2_1$ and $2_2$ are bevelled, so that with the edges $23_1$ and $23_2$ they create dihedral angles that accommodate the weld strips. These edges thus define chamfers. A weld strip is visible in FIG. 3, where the element 41 and the blade $2_1$ meet, and bearing the reference 9.

In the second, third and fourth embodiments of the invention which have been depicted in FIGS. 4 to 7, elements similar to those of the first embodiment bear the same references.

FIGS. 4 and 5 are enlargements in the region of the weld between a blade $2_1$ and two band elements 61 and 63. It should be noted that the region of a weld between a blade and a crown element is similar.

In order to reduce stresses in this type of connection, right-angled connections between the blade and the adjacent band are avoided. To do this, provision is made for fillets to be created in each blade.

FIG. 4 depicts two fillets 25 which are formed in the lower part of a blade $2_1$ in a portion located above two band elements 61 and 63. The central part of the blade has a first thickness $e_1$ which is substantially smaller than the thickness $e_2$ of the lower and outer edge $24_1$ of the blade $2_1$ which is engaged between the elements 61 and 63 so as to lie flush with the exterior surfaces $61_1$ and $63_1$. The fillets 25 are substantially symmetric with respect to a median axis Y-Y of the blade $2_1$.

To manufacture the blade $2_1$, the operator produces fillets 25 in a sheet of thickness $e_2$ by machining this sheet. However, the production of such fillets entails the use of a substantial amount of material intended to be removed by this machining process.

Hence, by way of an alternative which has been depicted in FIG. 5, it is proposed that use be made of a blade $2_1$ of thickness $e_s$ substantially identical to the thickness $e_i$ of the blade of the second embodiment. Two fillets 26 formed on the lower part of the blade $2_1$, are machined directly near the lower and outer edge $24_1$ of 10 this blade $2_1$ engaged between two elements 61 and 63 of the band. These fillets 26 are positioned substantially symmetrically with respect to the median axis Y-Y of the cross section of the blade $2_1$. These fillets 26 correspond to lateral fillets created in the blade $2_1$ in such a way that they define a localized narrowing near the region for welding. It thus becomes possible to source only a sheet of limited nominal thickness $e_3$.

Figure 6:
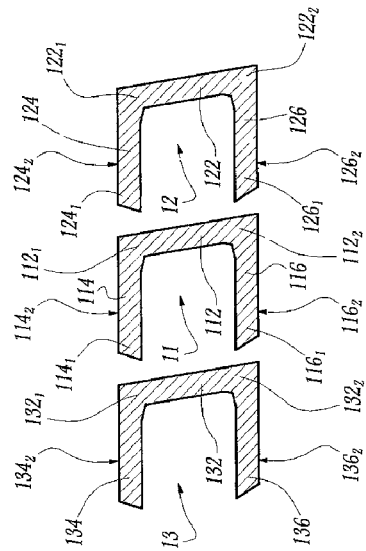
FIG. 6 is a runner according to a fourth embodiment, viewed from above.
Figure 7:
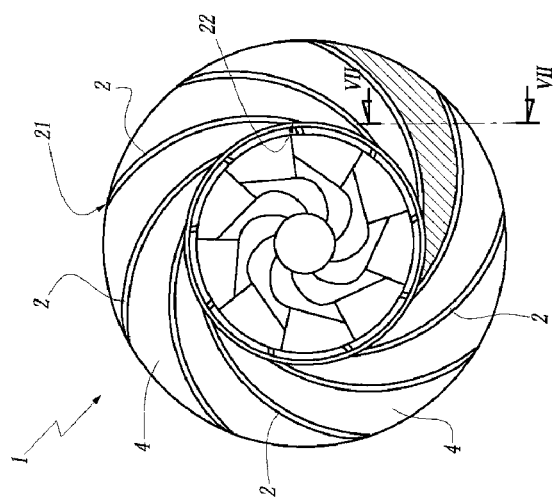
FIG. 7 is, to a larger scale, a part section on VII-VII of FIG. 6 through the runner of FIG. 6 while the runner is in the process of being manufactured.

FIGS. 6 and 7 depict the runner 1, comprising nine subassemblies, three of which are visible in FIG. 7, referenced 11, 12 and 13. The first subassembly 11 comprises a first crown part 114 and a first band part 116 which are connected by a blade 112. The three parts 112, 114 and 116 may be cast or welded together to form a one-piece element that can be fixed to other elements of the same type, using welding.

Similarly, the subassemblies 12 and 13 respectively comprise a second crown part 124 and a third crown part 134 together with a second band part 126 and a third band part 136. The parts 124 and 126 and the parts 134 and 136 are each respectively connected by a blade 122 and a blade 132 through casting or by welding.

Each of these subassemblies 11, 12 and 13 has a cross section in the shape of a lying-down U.

The parts 114 and 116 each comprise an edge $114_1$ and $116_1$ respectively facing an upper and inner edge $132_1$ and a lower and outer edge $132_2$ of the blade 132.

Likewise, the parts 124 and 126 each comprise an edge $124_1$ and $126_1$ respectively facing an upper and inner edge $112_1$ and a lower and outer edge $112_2$ of the blade 112.

It may also be noted that the blade 122 comprises an upper and inner edge $122_1$ and a lower and outer edge $122_2$.

The two crown and band parts of each of the subassemblies 11, 12 and 13 are respectively provided with an upper surface $114_2$, $116_2$, $124_2$, $126_2$, $134_2$ and $136_2$.

Thus, the edges of the blades 112, 122 and 132 are engaged between two crown or band elements $114_2$, $116_2$, $124_2$, $126_2$, $134_2$, and $136_2$. In other words, each of the lower and upper edges of the corresponding blade lies flush with the upper surface of the crown and of the adjacent band.

The edges $114_1$, $124_1$, $116_1$ and $126_1$ are mitered to create, with the edges $132_1$, $112_1$, $132_2$ and $112_2$ respectively, dihedral angles to accept weld strips which have not been depicted. In other words, these edges are chamfered.

This modular approach means that the subassembly 11 can be secured both to the subassembly 12 and to the subassembly 13 by a welding method termed exterior. In other words, there is no need to enter the runner 1, namely to get in between the crown and the band elements $114_2$, $116_2$, $124_2$, $126_2$, $134_2$, and $136_2$ in order to perform the welding operations aimed at joining the parts of the crown and of the band elements $114_2$, $116_2$, $124_2$, $126_2$, $134_2$, and $136_2$ of a first subassembly to the corresponding parts of an adjacent second subassembly.

Moreover, conveying the elements $2_1$, $2_2$, 41, 42, 43, 61, 62, 63, etc. or the subassembles 11, 12, 13 and equivalent that make up the runner to the site at which it will be used is appreciably improved in terms of lead times, making it possible to optimize costs.

It should be noted that the fillets 25, 26 depicted in FIGS. 4 and 5 can also be produced in the cast blades 112, 122 and 132.

By way of nonlimiting examples, the welding process used with the invention may be electron beam welding or laser welding.

Furthermore, it is possible to conceive of a runner comprising a number of crown elements and/or band elements other than nine thereof.

The invention claimed is:

1. A Francis-type runner for a hydraulic machine, comprising:
   a band with symmetry of revolution about a central axis of the runner,
   a crown with symmetry of revolution about the axis, and
   a plurality of blades extending between the crown and the band,
   at least two elements at least partially defining the band and at least two elements at least partially defining the crown, and wherein a first edge of each blade is arranged between two adjacent band elements and a second edge of each blade is arranged between two adjacent crown elements wherein the first edge and the second edge of each blade lies flush with exterior surfaces of the respective adjacent band elements and adjacent crown elements, wherein each band element and each crown element being fixed between two adjacent blades by welding, edges of each of the band elements and edges of each of the crown elements fixed to respective blades being beveled to define chamfers for welding.

2. The runner as claimed in claim 1, wherein at least one of the blades comprises two lateral fillets facing one another and positioned near at least one edge for welding to the band and/or to the crown.

3. The runner as claimed in claim 2, wherein the lateral fillets are machined in the blade.

4. The runner as claimed in claim 2, wherein the lateral fillets define a local narrowing.

5. A hydraulic machine, wherein it comprises a runner as claimed in claim 1.

6. The runner as claimed in claim 1, wherein at least three elements at least partially define the band.

7. The runner as claimed in claim 6, wherein at least three elements at least partially define the crown.

8. The runner as claimed in claim 1, wherein each blade separates adjacent elements of the band and/or crown along an entire radial length and entire circumferential length of the adjacent elements.

9. A method of assembling a runner, comprising the following steps:
   A) manufacturing band elements and crown elements, and
   B) assembling the band elements and the crown elements with at least one blade by welding and/or through casting, with a first edge of the at least one blade being arranged between two adjacent band elements and a second edge of the at least one blade arranged between two adjacent crown elements wherein the first edge and the second edge of the at least one blade lies flush with exterior surfaces of the respective adjacent band elements and adjacent crown elements, wherein each band element and each crown element being fixed between two adjacent blades by welding, edges of each of the band elements and edges of each of the crown elements fixed to respective blades being beveled to define chamfers for welding.

* * * * *